US 12,314,883 B1

(12) United States Patent
LeBeau et al.

(10) Patent No.: US 12,314,883 B1
(45) Date of Patent: May 27, 2025

(54) USER INTERFACE FOR TALENT MANAGEMENT

(71) Applicant: Workday, Inc., Pleasanton, CA (US)

(72) Inventors: Jake LeBeau, Pleasanton, CA (US); Anjum Matin, Vancouver (CA)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 18/781,559

(22) Filed: Jul. 23, 2024

(51) Int. Cl.
*G06Q 10/0637* (2023.01)
*G06F 3/0486* (2013.01)
*G06F 9/451* (2018.01)

(52) U.S. Cl.
CPC ....... *G06Q 10/0637* (2013.01); *G06F 3/0486* (2013.01); *G06F 9/451* (2018.02)

(58) Field of Classification Search
CPC ........ G06Q 10/00–50/00; G06F 1/00–2123/00
USPC ............................................... 705/7.11–7.42
See application file for complete search history.

(56) References Cited

U.S. PATENT DOCUMENTS

| | | | | |
|---|---|---|---|---|
| 10,528,916 | B1* | 1/2020 | Taylor | G06N 5/01 |
| 11,727,328 | B2* | 8/2023 | Petrosso | G06F 18/2148 |
| | | | | 705/7.14 |
| 2009/0164311 | A1* | 6/2009 | Deyo | G06Q 10/06 |
| | | | | 705/7.42 |
| 2014/0330734 | A1* | 11/2014 | Sung | G06Q 10/1053 |
| | | | | 705/321 |
| 2015/0356489 | A1* | 12/2015 | Kazai | G06Q 10/06398 |
| | | | | 705/7.42 |
| 2019/0026681 | A1* | 1/2019 | Polli | G06Q 10/06398 |
| 2019/0213522 | A1* | 7/2019 | Cong | G06Q 10/06393 |
| 2019/0295012 | A1* | 9/2019 | Marinescu | G06Q 10/0639 |
| 2019/0347598 | A1* | 11/2019 | Sandusky | G06Q 10/06393 |
| 2021/0103876 | A1* | 4/2021 | Petrosso | G06Q 10/1053 |
| 2021/0264371 | A1* | 8/2021 | Polli | A63F 13/79 |
| 2022/0245557 | A1* | 8/2022 | Minter | G06N 20/00 |
| 2022/0405692 | A1* | 12/2022 | Trikannad | G06Q 10/063114 |
| 2024/0144142 | A1* | 5/2024 | Khan | G06Q 10/0639 |

\* cited by examiner

*Primary Examiner* — Alan S Miller
(74) *Attorney, Agent, or Firm* — Van Pelt, Yi & James LLP

(57) ABSTRACT

A system, method, and device for generating a user interface for talent management are provided. The method generates the user interface based at least in part on determining user performance classifications for a set of users. The method includes (i) obtaining feedback data for a set of users, (ii) obtaining one or more characteristics for the set of users, (iii) querying a machine learning model for a predicted performance classification for the set of users, and (iv) generating a user interface comprising the predicted performance classification for at least a subset of the set of users. The predicted performance classification is presented on a user interface, for example, in a visualization such as an evaluation matrix that plots users according to their corresponding performance classifications.

22 Claims, 12 Drawing Sheets

400

Current Search — 410

[Save] [Clear All]

∨ Organizations — 412

☐ 3314 Tax (574)

☐ 3315 Payroll IWO (USA) (318)

☐ 3316 Payroll IWO (CAN) (122)

☐ 6700 Integrations (for use b ... (90)

☐ 3313 Purchasing (72)

[                                    ≡]

∨ Management Chain — 414

☐ Steve Morgan (CEO, Mgr 10 ... (2646)

☐ Manager Manager _3300 (1259)

☐ Manager Manager _3310 (1216)

☐ Manager Manager _3314 (1014)

☐ Logan McNeil (CHRO, HRE x... (561)

[                                    ≡]

∨ Job Profile — 416

☐ Tax Specialist (549)

[ Actions ▽ ]

— 426

Workers 2

Jon Westbro... | Sponsor ... Programs — 430

Exceeds

422 —

Blockers 16

Account... Account... | Carolina Souza | Cheryl Edwards

Facilities Facilitie... | Facilities Facilitie... | Fernando Diaz

Performance Meets

Detractors 7

Blair White | Donna Owens | Edwardo Silva

Margaret Granger | William Kent

Below

Low

Low

Stars 42     434     🎯 32

| Alberto Bassani | Amit Patel | Company Financial | Cory Young | Jake Lee (Exe VP . |
| Jennifer Carter | Jimmy Termina... | Kumar Chopra | Kumiko Sato | Laura Estes | +32 |

Emergers 22

| Andy PrrorationPy | Budget Manage... | Dennis Franc | Facilities Facilitie... | Helen Meyer |
| Jacqueli... Desjardi... | Jane Termina... | Joan Simmons | Lucy- Reg-FT - | Mala- Reg-FT-S | +12 |

Latents 11     🎯 10

| Azoe-VP Reg-FT-S | Chris- Trainee | Emma MultiplePr | Frank Pa rtialIPeri | Jackson -Director |
| Joe Green | Kirk Reynolds | Manager Manage... | Manager Manage.... | May Mul tipleCom | +1 |

High

High

Unplotted 2326

100+ ⟋ 440

There are too many users to display in this cell. You can pare down the list using the filters on the left.

FIG. 4C

USER INTERFACE FOR TALENT MANAGEMENT

BACKGROUND OF THE INVENTION

In contemporary organizational settings, the visualization of performance classification or evaluations on user interfaces often relies on traditional methods that may present inherent limitations and challenges. Typically, these methods involve configuring a user interface that enables managers or supervisors to guide periodic performance reviews, which can supplemented by subjective assessments, standardized metrics, and qualitative feedback. While these approaches have been longstanding practices within many organizations, they often suffer from several notable shortcomings, including the presentation of performance evaluations of users that import subjectivity and bias, the presentation of information that is retrospective in nature, focusing on past achievements and outcomes rather than future potential or developmental needs, and the presentation of information or visualizations that often lack granularity and context.

BRIEF DESCRIPTION OF THE DRAWINGS

Various embodiments of the invention are disclosed in the following detailed description and the accompanying drawings.

FIGS. 4A-C illustrate an example of user interface to present a visualization of a set of performance classifications for a set of users according to various embodiments of the present application.

DETAILED DESCRIPTION

Figure 1:
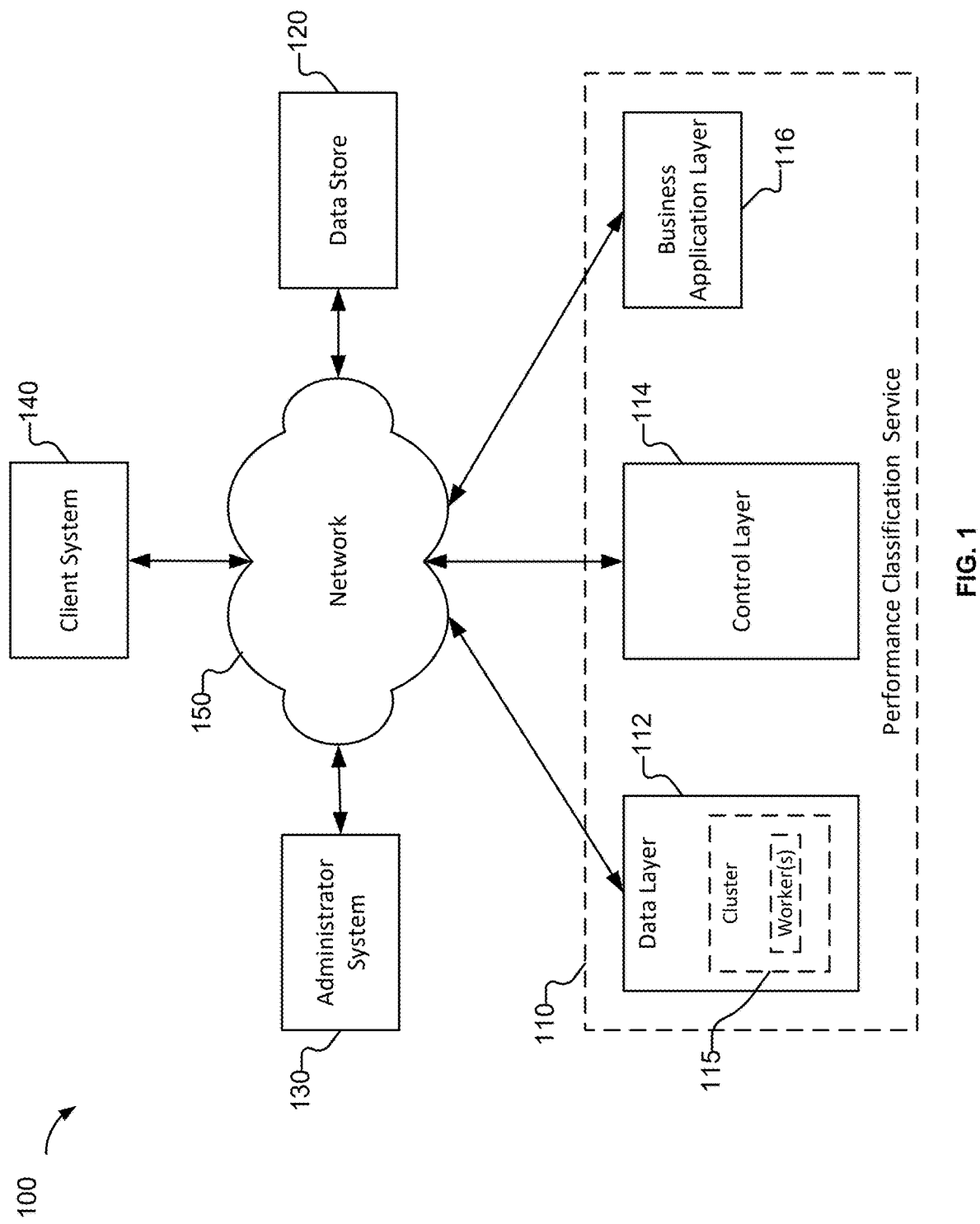
FIG. 1 is a block diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A modern user interface for performance evaluations can revolutionize the way organizations assess employee performance. By consolidating periodic reviews, subjective assessments, standardized metrics, and qualitative feedback into a single platform, the interface can overcome the limitations of traditional methods. This centralized hub can provide a comprehensive and transparent view of performance data, enabling managers and employees to make informed decisions and drive growth. The interface can also be designed to address common shortcomings of traditional approaches, such as bias and inconsistency, by incorporating AI-driven insights and objective metrics.

In light of the challenges of current related art performance classification or evaluation legacy systems, there is a growing recognition of the need for more agile, data-driven, and transparent approaches to the generation and visualization of performance classifications within organizations. By harnessing the power of machine learning and predictive analytics, organizations can overcome the limitations of traditional methods and user interface, and can perform and represent user/employee classifications or evaluations in a manner that enhances workforce productivity, talent management, and organizational performance. According to various embodiments, the development of a machine learning model to predict performance classifications of users, such as employees, empowers organizations with actionable insights, unbiased assessments, and personalized recommendations for optimizing employee performance and driving organizational success.

Recent advancements in machine learning (ML) algorithms have provided promising avenues for enhancing the accuracy and objectivity of performance evaluations within organizations. By leveraging vast amounts of data generated from various sources such as employee interactions, project outcomes, and individual skill sets, ML algorithms offer the potential to discern patterns, correlations, and predictors of performance with unprecedented granularity.

However, the deployment of ML models for performance prediction entails overcoming multifaceted challenges. First, the heterogeneity of data sources necessitates robust pre-processing techniques to ensure data quality and compatibility. Second, the interpretability of ML models is crucial, especially in organizational contexts where transparency and accountability are paramount. Third, the ethical considerations surrounding data privacy, fairness, and bias mitigation mandate careful design and validation of ML algorithms to uphold integrity and equity.

Against this backdrop, various embodiments provide a system and method for predicting performance classifications of users, such as employees within an organization, using machine learning processes. The system can integrate ML techniques with domain-specific knowledge to provide organizations with accurate, interpretable, and ethically sound performance assessments.

The system or service provided by various embodiments may be integrated with existing organizational systems and workflows. This interoperability enables continuous and/or real-time performance monitoring, adaptive feedback mechanisms, and personalized interventions to nurture talent and optimize organizational outcomes.

The system uses the predicted performance classifications to generate user interfaces comprising visualizations of the predicted performance classifications for one or more users. For example, the system configures the user interface to comprise a report, sheet, evaluation matrix, heat map, etc. that visualizes the performance classifications, and the system provides the user interface to a client system.

Various embodiments provide a system, method, and device for managing user performance classifications. The method includes (i) obtaining feedback data for a set of users, (ii) obtaining one or more characteristics for the set of users, (iii) querying a machine learning model for a predicted performance classification for the set of users, and (iv) providing the predicted performance classification for at least a subset of the set of users. In some embodiments, the providing the predicted performance classification includes generating a user interface comprising the performance classification and providing the user interface to a client system.

The machine learning model for predicting performance classifications of users, such as employees, can consider a diverse array of factors to enhance the accuracy and granularity of predictions. Examples of factors that the model may take into account in connection with providing predicted performance classifications include: individual skills and competencies, work experience and tenure, performance history, workload and task complexity, interpersonal skills and collaboration, goal alignment and motivation, adaptability and learning agility, attendance and punctuality, customer feedback and satisfaction, leadership and decision-making, innovation and initiative, emotional intelligence and resilience.

These factors represent a comprehensive spectrum of dimensions that contribute to individual performance within an organizational context, which can be taken into account by a ML model to predict performance classifications for current users. By incorporating a diverse range of features into the machine learning model, it can capture the multifaceted nature of employee contributions and provide more accurate and nuanced predictions of performance classifications.

Feedback data provided by users' managers can serve as a valuable source of information for generating predicted performance classifications through the machine learning model. The system can use feedback data in connection with:

Feature Engineering: the feedback data obtained by the system can be transformed into structured features that capture qualitative assessments of performance. This can include numerical ratings or scores provided by managers across different dimensions such as teamwork, communication skills, task completion, problem-solving, and leadership.

Sentiment Analysis: the system can apply Natural Language Processing (NLP) techniques to analyze the textual content of feedback provided by managers. Sentiment analysis algorithms can be implemented to extract sentiment scores or sentiment labels (e.g., positive, neutral, negative) from the feedback text to gauge the overall tone and perception of performance.

Topic Modeling: the system can implement topic modeling algorithms with respect to obtained feedback data to identify recurring themes or topics within the feedback narratives. This can help in uncovering specific areas of strength or improvement for individual employees, such as technical proficiency, client interaction skills, or project management abilities.

Temporal Analysis: the system can analyze temporal dynamics of feedback data to track performance trends over time. This may involve examining changes in feedback ratings or sentiments across different review periods to identify patterns of improvement, stagnation, or decline in performance.

Aggregation and Summary Statistics: Feedback data from multiple managers or review cycles can be aggregated and/or summarized to derive composite performance metrics for each user. This could include mean ratings, variance, or percentile ranks across different performance dimensions, providing a holistic view of overall performance.

Comparison with Benchmarks: the system can benchmark the obtained feedback data against predefined performance standards or organizational norms to assess performance relative to expectations. Deviations from benchmarks can serve as indicators of exceptional performance or areas requiring attention and development.

Feedback Network Analysis: the system can use network analysis techniques to explore the relationships and interactions between employees and their managers based on feedback exchanges. Analyzing the structure and centrality of feedback networks can uncover influential individuals, communication patterns, and information flow dynamics within the organization.

Model Training and Validation: The processed feedback data (e.g., pre-processed feedback data) can be used to train and validate the machine learning model for performance prediction. Supervised learning algorithms, such as regression or classification models, can be trained using labeled feedback data to learn patterns and relationships between feedback features and performance classifications.

By integrating feedback data into the machine learning model, the system enables organizations to enhance the granularity, objectivity, and timeliness of performance predictions. The implementation of machine learning models to predict performance classifications based at least in part on the feedback data (e.g., the pre-processed data) facilitates more informed decision-making processes related to talent management, succession planning, training interventions, and performance improvement initiatives. In some embodiments, the machine learning model is used to predict classification by determining the correlation between employee review and performance rating (e.g., the determination of the predictive power of the feedback, goals, gigs, and development items to the performance rating).

In some embodiments, the system pre-processes feedback data to remove statistically significant outliers or irrelevant data. The pre-processing of the feedback data is used to ensure the quality and reliability of predictions for performance classifications.

In the pre-processing stage, the system implements rigorous cleansing and filtering of the feedback data to eliminate statistically significant outliers and irrelevant information before being utilized for performance classification prediction. Initially, data points that exhibit extreme values or fall outside a predefined range of acceptable scores are identified as potential outliers. These outliers are then subjected to robust statistical techniques, such as Z-score normalization or interquartile range (IQR) filtering, to determine their significance and impact on the overall dataset. Outliers that deviate significantly from the mean or median of the distribution are flagged for further scrutiny. Additionally, feedback data that lacks relevance to the performance evaluation context, such as duplicate entries, incomplete responses, or unrelated comments, are systematically removed through data cleaning procedures. Furthermore, the system can implement outlier detection algorithms, such as Isolation Forest or Local Outlier Factor (LOF) to identify anomalies in the feedback dataset based on their deviation from the norm. The system can systematically remove outliers and irrelevant data points from the feedback data and use this pre-processed feedback data to ensure the integrity and accuracy of subsequent performance classification predictions, thereby enhancing the robustness of the machine learning model.

In some embodiments, the system incorporates (or takes into account) a reputational score for each manager who provided feedback within the feedback dataset in connection with determining a predicted performance classification. This reputational score serves as a measure of the manager's credibility, expertise, and fairness in evaluating employee performance. Initially, the system can aggregate feedback data across all managers (or a set of managers) and compute individual reputational scores based on various factors, including the consistency of ratings provided, alignment with organizational performance standards, and historical performance evaluations. The system can then configure a user interface to present the aggregated feedback data to a user via a client system. Managers who consistently provide insightful, constructive, and unbiased feedback are assigned higher reputational scores, reflecting their reliability and trustworthiness in assessing employee performance. Conversely, managers whose feedback exhibits inconsistencies, biases, or divergence from organizational norms receive lower reputational scores, signaling potential areas for improvement or additional oversight. When predicting performance classifications, the system weighs the feedback provided by each manager based on their reputational score, giving greater weight to evaluations from managers with higher credibility and reliability. By incorporating reputational scores into the prediction process, the system enhances the accuracy and fairness of performance classifications while promoting a culture of accountability and transparency within the organization.

In some embodiments, the system improves the computer by efficiently computing a performance classification. The system improves accuracy and efficiency of processing and memory use by preprocessing data and training and a model and enabling feedback to the outcomes and reevaluation of the data based on the feedback. The system further improves the computer by providing an efficient display to a user enabling assessment and intuitive and straightforward feedback to be provided to the system for reevaluation of the data set.

FIG. 1 is a block diagram of a network system according to various embodiments of the present application. In some embodiments, system 100 is implemented at least in part by system 200. System 100 may implement one or more of processes 600-900 of FIGS. 6-9.

In the example illustrated in FIG. 1, system 100 includes performance classification service 110, administrator system 130 and/or client system 140. System 100 may additionally include one or more data stores, such as data store 120, and network 150 over which one or more of performance classification service 110, client system 140, administrator system 130, and data store 120 are connected. In some embodiments, performance classification service 110 is implemented by a plurality of servers. In various embodiments, network 150 includes one or more of a wired network and/or a wireless network such as a cellular network, a wireless local area network (WLAN), or any other appropriate network. System 100 may include various other systems or terminals.

The system can use performance classification service 110 to generate a user interface comprising a representation of performance classifications. The user interface can be provided to client system 140 for presentation to a user. The generating the user interface may include generating a visualization to represent the performance classification (e.g., a heat map, an evaluation matrix, a report, etc.) and configuring the user interface to comprise the visualization.

In some embodiments, performance classification service 110 is configured to: (a) receive talent information (e.g., receive performance data, feedback data, user characteristics, or the like for a set of users for an organization); (b) pre-process talent information (e.g., to remove outliers or otherwise cleanse the data); (c) train a classifier (e.g., a machine learning model) to predict user performance, such as to generate predicted performance classifications for a set of users; (d) query the classifier to generate the predicted user performance (e.g., the predicted performance classification); (e) receive a request to generate a visualization or representation of certain talent information (e.g., to create a heat map or evaluation matrix based on the predicted performance classifications); (f) cause the visualization or representation to be generated; (g) receive a request to modify a performance classification, such as a user input to the visualization or representation; (h) update a performance classification based at least in part on a request to modify the performance classification; (i) provide the visualization/representation of the data, such as by display via a user interface; and/or (j) perform an active measure based at least in part on the talent information or performance classifications (e.g., identify talent gaps, recommend and/or provide additional training or other remedial measures for users, recommend succession planning, identify compensation disparities based on performance classifications and/or similarly situated users/employees, etc.).

In some embodiments, performance classification service 110 comprises data layer 112, control layer 114, and/or business application layer 116. Data layer 112, control layer 114, and/or business application layer 116 are respectively implemented by one or more servers. In some embodiments, data layer 112 comprises one or more clusters of compute resources (e.g., virtual machines).

Data layer 112 obtains a query received by performance classification service 110 and processes the query to provide result data, such as in the form of a report, a table, a matrix, etc. Data layer 112 receives the query, determines a set of data stored in a dataset (e.g., a dataset stored in data store 120), obtains the set of data, and generates the report based at least in part on the set of data. In some embodiments, data layer 112 generates a predicted performance classification, such as by querying a machine learning model. In some embodiments, data layer 112 updates a performance classification (e.g., a current performance classification, such as the predicted performance classification or performance classification that has been previously updated) based at least in part on user input, such as by a manager using client system 140.

Data layer 112 can implement one or more application programming interfaces (APIs) to connect to and obtain data from a dataset (e.g., a dataset stored in data store 120). In some embodiments, a user (e.g., an administrator using administrator system 130) can define or otherwise configure a new API to connect to data store 120 or another data store, such as a third party service or an organization's own data store. In this manner, the APIs can be configured to obtain talent information from one or more data sources and used in connection with talent management, such as performance classification, succession planning, compensation reviews, etc.

In response to obtaining the set of data and generating the report, system 100 may use data layer 112 to generate a visualization or representation of the data/report. For example, data layer 112 can generate an evaluation matrix that plots performance classifications for a set of users along one or more performance dimensions (e.g., performance, potential, etc.). As another example, data layer 112 can generate a heat map that identifies the densities for a set of performance classifications at a set of roles.

Performance classification service 110 provides the result (e.g., responsive data, the report, the table, etc.) or generates visualization/representation for the query to client system 140. For example, performance classification service 110 uses business application layer 116 to configure a user interface to display the results (e.g., provide a report, sheet, evaluation matrix, heat map, etc. to client system 140).

In some embodiments, data layer 112 manages a cluster of compute resources 115 to execute the business logic of the query (e.g., to process the set of requests/subqueries against the applicable data stored in data store 120 responsive to the query) and/or to generate a result, such as the visualization or representation of the talent information (e.g., the performance classifications). For example, data layer 112 establishes the connections between the set of compute resources and the data source(s) and allocates the workload for the business logic across the set of compute resources.

According to various embodiments, business application layer 116 provides an interface via which a user (e.g., using client system 140) may interact with various applications such as a development application for developing a service, application, and/or code, an application to access raw data (e.g., data stored in data store 120), an application to analyze data (e.g., log data), etc. Various other applications can be provided by business application layer 116. For example, a user queries data layer 112 by sending a query/request to business application layer 116, which interfaces with data layer 112 and/or data store 120 to obtain information responsive to the query (e.g., business application layer 116 formats the query according to the applicable syntax and sends the formatted query to data layer 112, such as via control layer 114). As another example, an administrator using administrator system 130 uses an interface provided/configured by business application layer 116 to configure (e.g., define) one or more security policies including access permissions to information stored on data store 120, permissions to access performance profiles, etc.

Administrator system 130 comprises an administrator system for use by an administrator. For example, administrator system 130 comprises a system for communication, data access, computation, etc. An administrator uses administrator system 130 to maintain and/or configure performance classification service 110 and/or one or more of data stores (e.g., data store 120). For example, an administrator uses administrator system 130 to start and/or stop services on performance classification service 110 and/or data store 120, to reboot data store 120, to install software on performance classification service 110 and/or data store 120, to add, modify, and/or remove data on data store 120, etc. Administrator system 130 communicates with performance classification service 110 and/or data store 120 via a web-interface. For example, administrator system 130 communicates with performance classification service 110 and/or data store 120 via a web-browser installed on administrator system 130. As an example, administrator system 130 communicates with performance classification service 110 and/or data store 120 via an application running on administrator system 130.

In various embodiments, an administrator (or other user associated with a tenant or entity with which the tenant is associated such as a customer) uses administrator system 130 to configure a service provided to a tenant (e.g., an instantiation for an organization associated with a particular hypercube or planning model). As an example, the administrator uses administrator system 130 to communicate with performance classification service 110 to configure the service provided to the tenant. For example, administrator system 130 may communicate with performance classification service 110 via business application layer 116. In some embodiments, business application layer 116 serves as a gateway via which the administrator may interface to manage, configure, etc. data layer 112, control layer 114, and/or business application layer 116. Administrator system 130 may configure one or more policies for performance classification service 110, such as one or more security policies and/or one or more compute resource policies, etc.

Data store 120 stores one or more datasets. In various embodiments, the one or more datasets comprise human resources data, talent data, performance data, financial data, organizational planning data, or any other appropriate data. In some embodiments, data store 120 stores one or more datasets for a plurality of tenants. In various embodiments, a tenant comprises an organization such as a company, a government entity, a sub-organization of an organization (e.g., a department), or any other appropriate organization. For example, data store 120 comprises one or more database systems for storing data in a table-based data structure, an object-based data structure, etc. In various embodiments, data store 120 comprises one or more of: a business database system, a human resources database system, a financial database system, a university database system, a medical database system, a manufacturing database system, or any other appropriate system. In some embodiments, data store 120 comprises one or more object-oriented database systems.

According to various embodiments, a user uses system 100 (e.g., a client or terminal, such as client system 140, that connects to performance classification service 110 via network 150) to define business logic and/or to execute such business logic with respect to data (e.g., one or more datasets) stored on data store 120. As an example, a user inputs to client system 140 one or more requests for a planning session to be communicated to performance classification service 110 for performance classification service 110 to load a planning session and enable the user to implement various scenarios of talent planning sessions (e.g., succession planning sessions, performance evaluation sessions, compensation review sessions, etc.). As another example, a user inputs to client system 140 one or more queries to be run against a dataset. In response to receiving the business logic, performance classification service 110 uses data layer 112 (e.g., a cluster of compute resources) to execute the business logic (e.g., with respect to data stored by data store 120) and provide a result to the user (e.g., via a user interface provided on client system 140). In some embodiments, the result comprises information or a set of information that is responsive to the execution of the business logic. Performance classification service 110 may enforce one or more security policies with respect to the result, including restricting access to certain information to which the user associated with client system 140 does not have permissions or otherwise masking certain information. In some embodiments, the result comprises a report including information that is responsive to the execution of the business logic or selectable elements (e.g., links such as hyperlinks) that point to information that is responsive to the execution of the business logic. The result may be provided in a data frame, a report, and/or a sheet.

In some embodiments, data layer 112, control layer 114, and/or business application layer 116 are implemented on a single server or a plurality of servers. For example, data layer 112 and business application layer 116 are different modules running on a same server or set of servers.

Figure 2:
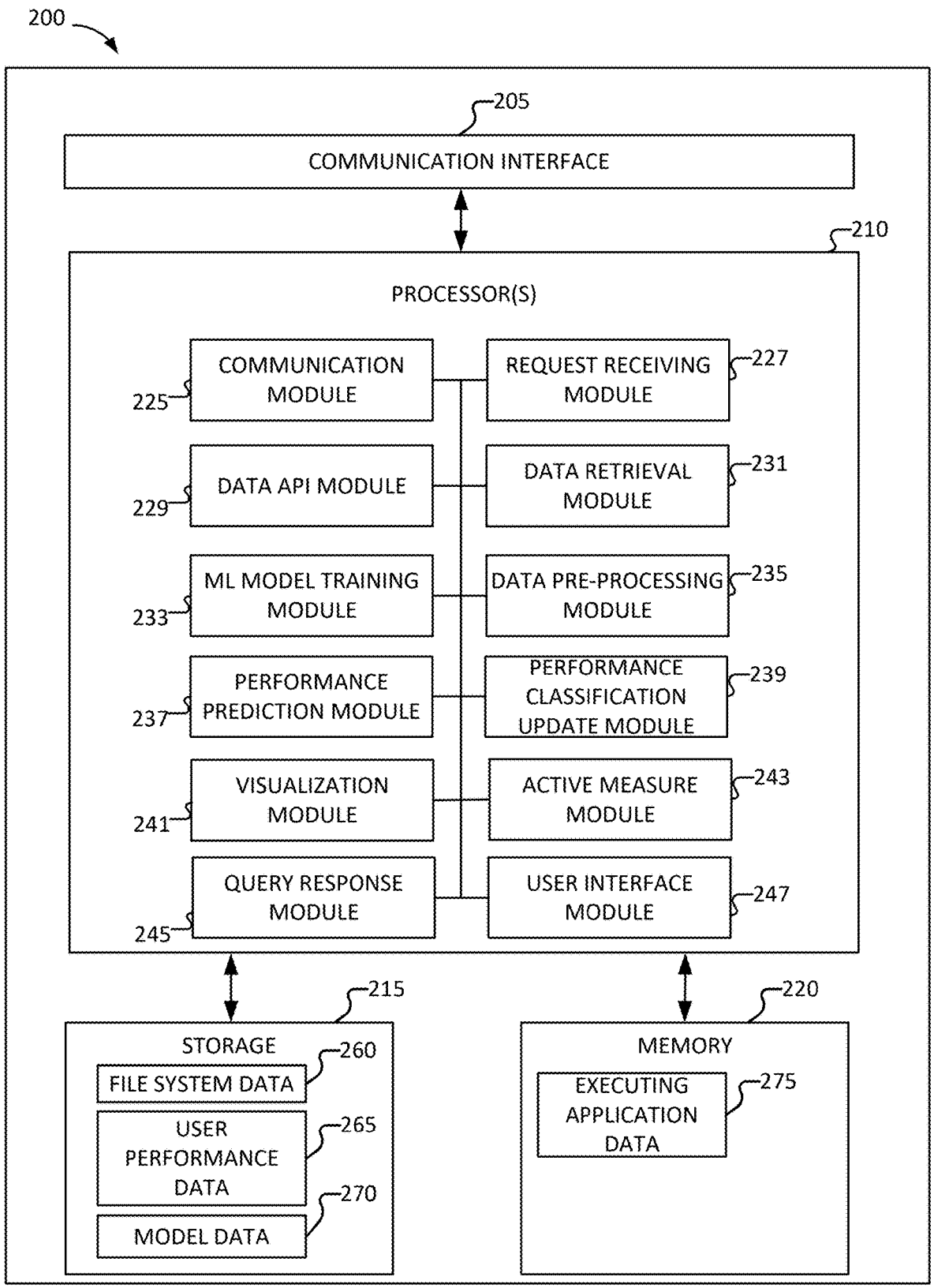
FIG. 2 is a block diagram of a system for providing performance classifications according to various embodiments of the present application.

FIG. 2 is a block diagram of a system for providing performance classifications according to various embodiments of the present application. In some embodiments, system 200 is implemented at least in part by system 100. System 200 may implement one or more of processes 600-900 of FIGS. 6-9.

System 200 is configured to generate one or more user interfaces to be presented to users via a client system. The user interfaces provide a service via which a user can manage, for example, talent or the generation of performance evaluations for a set of users (e.g., a set of reports or other employees). System 200 may generate a prepopulated performance classification, and the user can use selectable elements on the user interface, such as by dragging and dropping icons, to modify the performance classifications for one more users. The user interface can be provided to a client system for presentation to a user such as a manger that is performing the performance evaluation or a manager that is reviewing the organization's talent management. Generating the user interface may include generating a visualization to represent the performance classification (e.g., a heat map, an evaluation matrix, a report, etc.) and configuring the user interface to comprise the visualization.

In the example shown, system 200 implements one or more modules in connection with providing a performance classification service, such as to provide visualizations based on performance classifications and to allow users to perform organization or talent planning. System 200 comprises communication interface 205, one or more processors 210, storage 215, and/or memory 220. One or more processors 210 comprises one or more of communication module 225, request receiving module 227, data API module 229, data retrieval module 231, ML model training module 233, data pre-processing module 235, performance prediction module 237, performance classification update module 239, visualization module 241, active measure module 243, query response module 245, and/or user interface module 247.

In some embodiments, system 200 comprises communication module 225. System 200 uses communication module 225 to communicate with various client terminals or user systems such as a user system (e.g., client system 140) or an administrator system (e.g., administrator system 130), or other layers of system 100 such as a data layer 112, business application layer 116, data store 120, etc. For example, communication module 225 provides to communication interface 205 information that is to be communicated. As another example, communication interface 205 provides to communication module 225 information received by system 200. Communication module 225 is configured to receive one or more queries or requests to execute business logic (e.g., requests for processing workloads, servicing queries, etc.) such as from various client terminals or user systems (e.g., from the terminals or systems via a business application layer). The one or more queries or requests to execute tasks are with respect to information stored in one or more datasets (e.g., data stored in data store 120). For example, communication module 225 receives requests for talent planning sessions, talent evaluation sessions, succession planning sessions, manipulation of data stored in data store 120, representations/visualizations of data (e.g., in the form of reports such as tables or evaluation matrices or other tables), etc. Communication module 225 is configured to provide to various client terminals or user systems information such as information that is responsive to one or more queries or tasks requested to be executed (e.g., user interfaces comprising reports for the results). In some embodiments, communication module 225 provides the information to the various client terminals or user systems in the form of one or more data frames, reports (e.g., according to a predefined format or to a requested format), tables, and/or via one or more user interfaces (e.g., an interface that the user system is caused to display).

In some embodiments, system 200 comprises request receiving module 227. System 200 uses request receiving module 227 to receive a query, such as from a user operating a client terminal (e.g., client system 140). Examples of queries include a request for a planning session, a request for talent planning sessions, a request for talent evaluation sessions, a request for succession planning sessions, a request for a predicted performance classification, a request to view a representation of data comprised in a dataset (e.g., a request for a visualization representing performance classifications for a set of one or more users), a request to manipulate data in the dataset, a request to update a performance classification associated with a user, etc. Examples of requests to manipulate data in the dataset include (i) a request to add, delete, or insert a new dimension of the data, (ii) a request to add, delete, or insert a new value for a particular location along one or more dimensions, (iii) a request to sort the data according to a particular sort query, (iv) a request to filter the data according to a particular filter query, etc. Various other requests to manipulate the data may be received.

In some embodiments, system 200 comprises data API module 229. System 200 uses data API module 229 to expose one or more datasets to other modules or other systems. For example, the API module 229 is configurable by one or more other systems to enable administrators or other users to modify or create a representation or visualization of performance classifications for a set of users. For example, the API module 229 allows a user to configure a representation or visualization according to the user's or organization's preferences. Additionally, system 200 uses API module 229 to enable organizations (e.g., an administrator) to expose their own datasets (e.g., performance classifications or other data that can be used to determine performance classifications for its employees) to system 200 to use such datasets as a source for information pertaining to its employees that can be used to determine performance classifications or performance characteristics for its employees.

In some embodiments, API module 229 is configured to enable users (e.g., administrators for an organization) to develop their own interfaces to datasets that are used to perform talent management operations, such as to predict a performance classification.

In some embodiments, system 200 comprises data retrieval module 231. System 200 uses data retrieval module 231 to retrieve data from a dataset, such as in connection with generating a predicted performance classification, a representation of an organization's talent information. Examples of an organization's talent information include evaluation information, succession planning information (e.g., an indication of successors for certain roles, an indication of a user's or employee's capability or potential to succeed a particular role, etc.), performance information (e.g., user performance classifications or performance characteristics), feedback data, etc. If the query received by request receiving module 227 is a request to represent data stored in a dataset, such as to obtain a report, table, evaluation matrix, or other dashboard for the data, data retrieval module 231 determines data within the dataset that is to be obtained and used for generating the result (e.g., the report, table, evaluation matrix, or other dashboard, etc.). Data retrieval module 231 obtains the identified data based at least in part on querying the dataset using one or more queries. Additionally, data retrieval module 231 can obtain the identified data based at least in part on querying a classifier (e.g., performance prediction module 237) such as a machine learning model for a predicted performance classification.

In some embodiments, system 200 comprises ML model training module 233. System 200 uses ML model training module 233 to train a machine learning (ML) model to generate a predicted performance classification for one or more users. ML model training module 233 can train the ML model to generate predicted performance classifications based at least in part on feedback data for a set of users. The ML model may be trained in a manner that the ML model generates a predicted performance classification for a user based on the feedback data for the user and one or more user characteristics. In some embodiments, the ML model may be configured to take into account various other types of information in connection with predicting performance classifications.

ML model training module 233 implements one or more machine learning processes/techniques to train the ML model. Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

In some embodiments, system 200 comprises data pre-processing module 235. System 200 uses data pre-processing module 235 to pre-process feedback data and/or other types of information that is used in connection with generating a predicted performance classification. Data pre-processing module 235 can be configured to pre-process feedback data to remove statistically significant outliers or irrelevant data. The pre-processing of the feedback data is used to ensure the quality and reliability of predictions for performance classifications.

In some embodiments, system 200 comprises performance prediction module 237. System 200 uses performance prediction module 237 to obtain a predicted performance classification. Performance prediction module 237 can be configured to obtain a predicted performance classification based at least in part on querying a classifier such as an ML model stored in model data 270. In connection with obtaining a predicted performance classification, performance prediction module 237 can extract a set of features based on one or more of feedback data, one or more user characteristics, or other information (e.g., talent information for an organization), and query the classifier based at least in part on the set of features.

In some embodiments, system 200 comprises performance classification update module 239. System 200 uses performance classification update module 239 to update a current performance classification. The current performance classification can be a predicted performance classification, a performance classification for a previous evaluation period, or a previously updated performance classification. Performance classification update module 239 updates the current performance classification based at least in part on a user input, such as an input from a manager to modify the current performance classification. An example of a user input used to modify the current performance classification is a drag and drop of a representation for a user (e.g., a user icon) on an evaluation matrix from a first location corresponding to a first performance classification to a second location corresponding to a second performance classification. The performance classification update module 239 updates the performance classification based at least in part on the modification associated with the user input.

In some embodiments, system 200 comprises visualization module 241. System 200 uses visualization module 241 to generate a visualization or other representation of talent information. The visualization or representation can be configured to visualize the performance for one or more users (e.g., one or more employees for an organization). Examples of the visualization or representation include a heat map, an evaluation matrix, a table, or other dashboard.

In some embodiments, system 200 comprises active measure module 243. System 200 uses active measure module 243 to perform an active measure based at least in part on a talent management operation. For example, in response to obtaining a predicted performance classification, active measure module 243 can pre-populate a plotting of user representations (e.g., user names, user icons, etc.) on the visualization (e.g., an evaluation matrix) based at least in part on a predicted performance. As another example, in response to determining that the predicted performance classification satisfies a predefined criteria (e.g., a performance classification being less than a predefined threshold), active measure module 243 can alert a user (e.g., a manager) or provide recommended remedial measures, such as recommend certain training to fill performance gaps. As another example, in response to obtaining performance classifications for a set of users associated with an organization, active measure module 243 can identify talent gaps and alert a user (e.g., a manager) such as via a prompt to the user or a configuration of a dashboard. As another example, in response to obtaining the performance classifications for a set of users associated with an organization, active measure module 243 prepopulates a succession plan for a set of roles. As another example, in response to obtaining feedback data for a set of users for an organization, active measure module 243 can identify (and alert a user of) biases in the feedback data, such as managers that exhibit a bias towards a user or an unconscious bias when providing the feedback. Various other active measures may be implemented.

In some embodiments, system 200 comprises query response module 245. System 200 uses query response module 245 to configure a response to a received query. As an illustrative example, if the query is a request for the populating of an evaluation matrix based on a set of users' performance classifications, query response module 245 can orchestrate the generation of the visualization (e.g., the evaluation matrix) and configure the user interface via which the visualization is to be provided to another system. The orchestration may include causing data retrieval module 231 to obtain feedback data and/or user characteristics, causing data pre-processing module 235 to pre-process the obtained data, querying performance prediction module 237 for a set of predicted performance classifications, requesting that visualization module 241 generates a visualization based at least in part on the performance classifications, and querying user interface module 247 to configure a user interface with the visualization.

In some embodiments, system 200 comprises user interface module 247. System 200 uses user interface module 247 in connection with configuring information (or the display thereof) to interact with the user (e.g., via client system 140 and/or administrator system 130 of system 100). In some embodiments, user interface module 247 configures a user interface to be displayed at a client system, such as an interface that is provided in a web browser at the client system. User interface module 247 may configure a user interface via which a query may be input. In some embodiments, user interface module 247 configures a user interface to provide a response to the query, such as by providing one or more visualizations or representations that is/are responsive to the query or task executed with respect to the source dataset(s) (e.g., a query or task executed against data stored on data store 120).

User interface module 247 configures the user interface displayed at a client system to provide the generated visualization or representation of the data responsive to the received request/query. For example, user interface module 247 configures the user interface to display an evaluation matrix, a heat map, a chart, a table, or report of the data.

According to various embodiments, storage 215 comprises one or more of file system data 260, user performance data 265, and/or model data 270. Storage 215 comprises a shared storage (e.g., a network storage system).

In some embodiments, file system data 260 comprises a database such as one or more datasets (e.g., one or more datasets for one or more tenants, etc.). File system data 260 comprises data such as a dataset for historical information pertaining to user activity, a human resources database, a financial database, etc. File system data 260 may additionally include information pertaining to a set of users for an organization (e.g., an organization's workforce), such as user characteristics, feedback data, performance data, etc.

In some embodiments, user performance data 265 comprises feedback data or other performance data for a set of users. Additionally, or alternatively, user performance data 265 comprises performance classifications, including predicted performance classifications obtained by querying performance prediction module 237 for a predicted performance classification.

In some embodiments, model data 270 comprises one or more machine learning models to classify users or generate performance predictions, such as predicted performance classifications.

According to various embodiments, memory 220 comprises executing application data 275. Executing application data 275 comprises data obtained or used in connection with executing an application such as an application executing on a tenant. In some embodiments, the application comprises one or more applications that perform one or more of receiving and/or executing a query or task, generating a report and/or configuring information that is responsive to an executed query or task, and/or providing to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

According to various embodiments, the system generates a visualization or representation based on performance classifications. The visualization can represent one or more users' performance (e.g., performance characteristics) along one or more dimensions. In some implementations, the system pre-populates the visualization based on a predicted performance classification, such as a prediction generated by a machine learning model. Alternatively, the system may pre-populate the visualization based on a user's performance classification from a previous evaluation period (e.g., a previous year's classification, etc.). The system may be configured to receive a user input, such as to update the visualization by updating placement of a user representation (e.g., a user name, a user indicator/icon, etc.) along one or more of the dimensions (e.g., performance, potential, etc.) based on a user input (e.g., a drag and drop operation performed by a manager to change a placement of the user representation).

Figure 3:
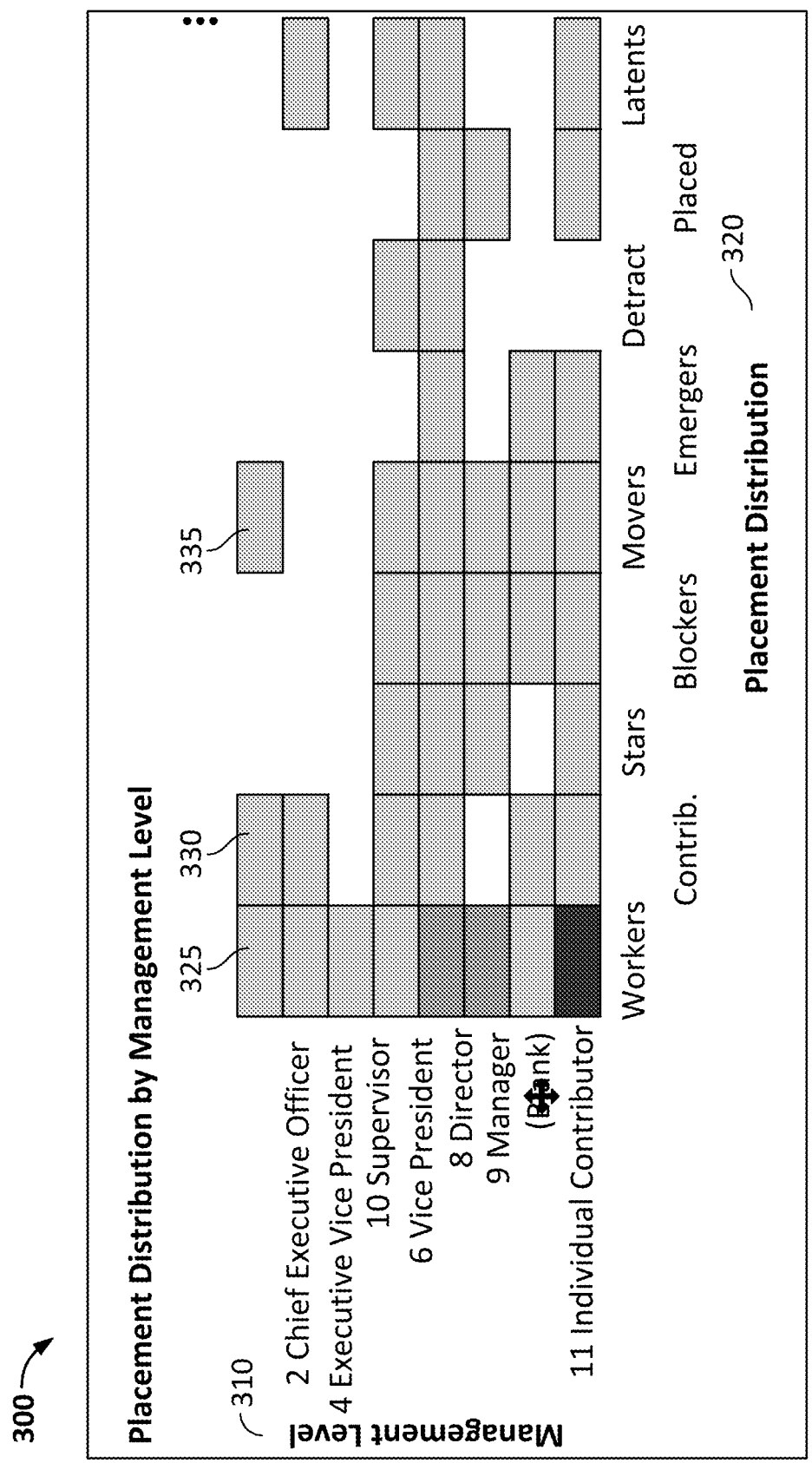
FIG. 3 illustrates an example of a user interface to present a visualization of a set of performance classifications for a set of users according to various embodiments of the present application.

In some embodiments, the visualization is a heat map that plots a set of users according to their respective performance classifications. For example, the heat map visualization provides a representation of a mapping or distribution of people plotted into different performance classifications according to management level. An example of a heat map is shown in FIG. 3. The different shading or coloring in each area of the heat map can convey the density of the number of users having the same performance classification.

In some embodiments, the visualization provides a juxtaposition of a representation of a current performance classification for a user against one or more of the user's previous performance classifications. For example, the visualization juxtaposes the user's current performance classification (e.g., a classification along one or more performance dimensions) against the user's performance classification during an immediately preceding evaluation period.

In some embodiments, the visualization is an evaluation matrix comprising cells corresponding to the intersection of values along different dimensions. An example of an evaluation matrix is visualization 400 provided in FIGS. 4A-4C. In this evaluation matrix, the performance dimensions include performance and potential, and each cell has an associated performance value and a potential value. The system plots a user (e.g., representations of the user, such as a user name, user icon, or user profile picture) according to a placement defined by the particular user's performance classification, such as the associated value along the applicable performance dimensions. Although visualization 400 illustrates a representation of the performance classifications along two dimensions, in various embodiments, the visualization provides an N-dimensional cube with each dimension corresponding to a different performance dimension or user characteristic dimension.

The system can generate the evaluation matrix in connection with providing different services for an organization (e.g., a manager) to evaluate talent within the organization. For example, the evaluation matrix can be used in connection with a compensation review service for users to assess the compensation of different users in the organization according to the users' performance classifications. The plotting of users according to compensation and performance classification allows a manager to intuitively and easily assess how certain users are compensated relative to their current performance classifications and as compared to other similarly situated users. As another example, the evaluation matrix can be used in connection with a worker review service. As another example, the evaluation matrix can be used in connection with a performance review process.

In some embodiments, the visualization is a succession table for a succession planning service. The system can generate the succession table succession planning for one or more roles by plotting users to roles that match the users' characteristics and/or performance classification. For example, the succession table may identify a set of users that could be considered as successors for a particular role.

The system can provide the visualization on a user interface that is configured to receive inputs from other services or systems to filter the data or to slice and dice the data along different dimensions, such as location, organization, department, manager, etc. For example, the user interface may comprise a frame that comprises one or more dialog boxes, drop down boxes, or other input elements, or any combination thereof to allow a user to filter and dissect an organization's talent data, such as performance classifications for the organization's employees.

FIG. 3 illustrates an example of a user interface to present a visualization of a set of performance classifications for a set of users according to various embodiments of the present application. In the example shown, visualization 300 comprises a heatmap that plots users along a plurality of dimensions. Specifically, visualization 300 comprises a heatmap that plots the distribution of users according to their respective roles and performance classifications. However, the system may be configured to generate heatmaps along different dimensions, such as user characteristics, organization characteristics, or user performance classifications, etc.

As shown, a vertical dimension 310 corresponds to a management level or role within the organization. Examples of different management levels that can be plotted include Chief Executive Officer, Executive Vice President, Supervisor, Vice President, Director, Manager, Individual Contributor, etc. The horizontal dimension 320 corresponds to a placement distribution, which is indicative of a performance classification for users within the organization. For example, the system associates each user with a performer type based on the user's performance classification (e.g., according to a predefined mapping of performance classifications to performer types or based on a predefined formula or algorithm). Examples of performer types include workers, contributors, stars, blockers, movers, emergers, detractors, placed, and latents.

Visualization 300 comprises a representation of a density of a performer type for each management role. For example, visualization 300 comprises representation 325 that illustrates a relative number of users that are deemed workers in the Chief Executive Officer role; representation 330 that illustrates a relative number of users that are deemed contributors in the Chief Executive Officer role; and representation 335 that illustrates a relative number of users that are deemed movers in the Chief Executive Officer role. The representations provided in the visualization to convey the density of users having a particular performance classification role can be a number, a shaded representation (with different shadings corresponding to different density levels), a colored representation (with different colorings corresponding to different density levels), etc. Various other techniques may be implemented to illustrate the user densities.

Figure 4B:
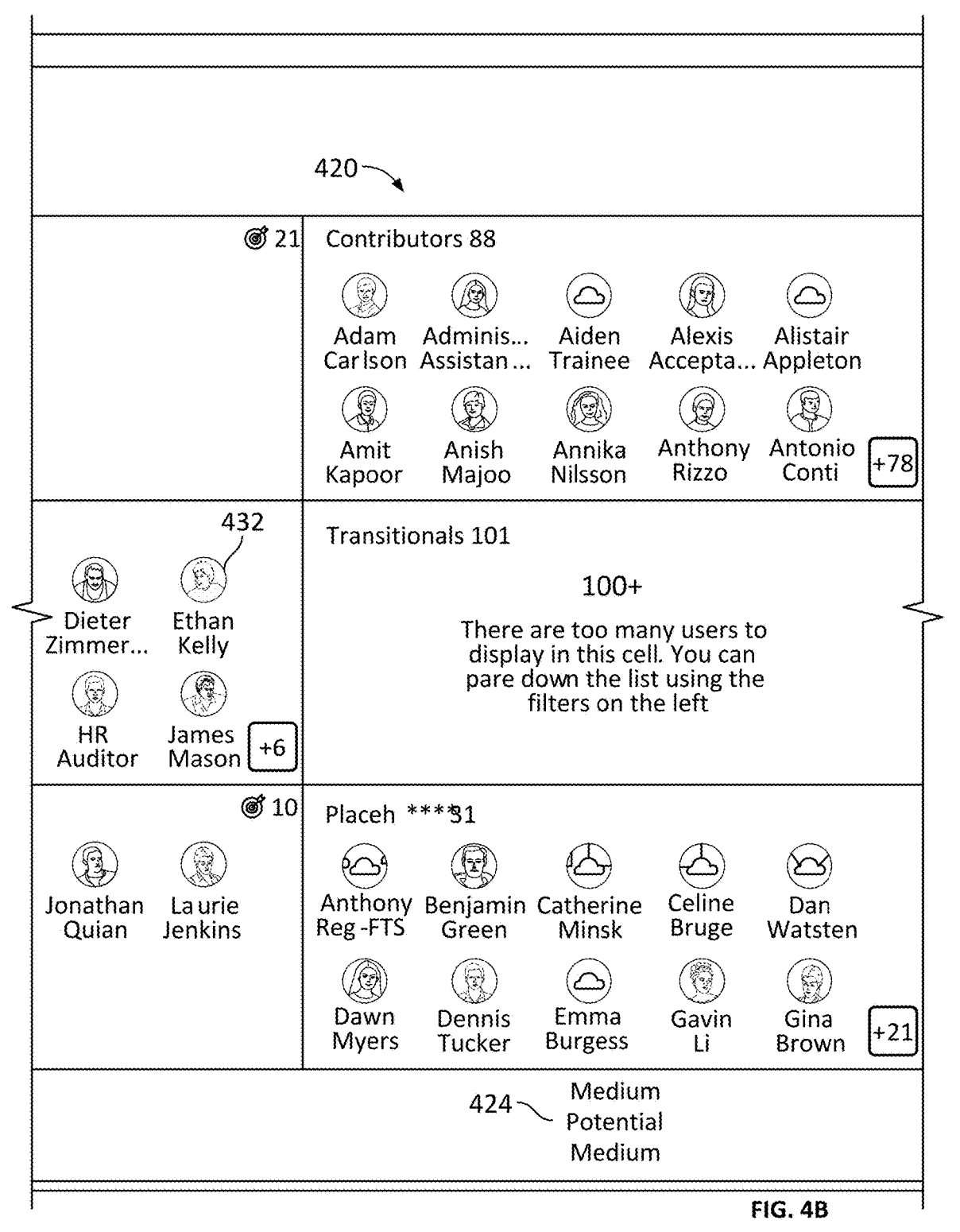

FIGS. 4A-4C illustrates an example of a user interface to present a visualization of a set of performance classifications for a set of users according to various embodiments of the present application. In the example shown, visualization 400 comprises evaluation matrix 420 within which a set of users are plotted according to their performance classifications. The system may configure the user interface on which visualization 400 is provided to comprise a filtering frame 410 (e.g., a set of controls for a user to define the type of data to be illustrated in the evaluation matrix 420).

As illustrated, filtering frame 410 comprises controls with which the type of data illustrated in the evaluation matrix 420 is defined. For example, a user can use the selectable elements 412 (e.g., selection boxes, drop down boxes, text boxes, etc.) to select the set of one or more organizations (or sub-organizations) for which users are to be plotted in the evaluation matrix. As another example, a user can use the selectable elements 414 to select the management chain to be represented in the evaluation matrix. For example, the user can use selectable elements 414 to select one or more managers for which users that report to the selected managers are to be plotted in the evaluation matrix. As another example, a user can use selectable elements 416 to select the job profile(s) for which users are to be plotted in the evaluation matrix.

Evaluation matrix 420, which can be presented on a user interface, comprises a plurality of cells (e.g., cells 426 and 428) corresponding to various intersection points between the dimensions being plotted. In this example, the dimensions plotted in evaluation matrix 420 comprise a performance dimension 422 and a potential dimension 424.

In some embodiments, each cell in the evaluation matrix 420 is mapped to a particular performer type. In the example shown, the intersection between a value exceeds along the performance dimension 422 and a value of low along the potential dimension 424 is mapped to the performer type: worker. Similarly, the intersection between a value exceeds along the performance dimension 422 and a value of medium along the potential dimension 424 is mapped to the performer type: contributor. Various other performer types can be defined according to their performance-potential pair. Examples of the performer type classifications are defined in Table 1.

TABLE 1

Performer Types

| Performer Type | Value in Performance Dimension | Value in Potential Dimension |
|---|---|---|
| Worker | Exceeds (e.g., exceeds expectations) | Low |
| Contributor | Exceeds | Medium |
| Star | Exceeds | High |
| Blocker | Meets (e.g., meets expectations) | Low |
| Transitionals | Meets | Medium |
| Emergers | Meets | High |
| Detractors | Below (e.g., below expectations) | Low |
| Placeholders | Below | Medium |
| Latents | Below | High |

In some embodiments, the system plots the users according to their respective performance-potential pairs. The system can pre-populate the evaluation matrix 420 based on predicted performance classifications, such as a classification generated (predicted) by a machine learning model. Alternatively, the system may pre-populate the evaluation matrix 420 based on the users' respective performance classifications from a prior evaluation period (e.g., the immediately preceding evaluation period). In the example shown, user 430 is plotted as a worker (e.g., having a performance value equal to exceeds, and a potential value equal to low). User 432 is plotted as a blocker (e.g., having a performance value equal to meets, and a potential value equal to low). User 434 is plotted as a star (e.g., having a performance value equal to exceeds and a potential value equal to high).

Visualization 400 may comprise a frame 440 comprising an indication of one or more users that are unplotted. For example, frame 440 can comprise a representation for users that have not been plotted, such as in the case that the user does not have an associated predicted performance classification (e.g., if the confidence of a prediction generated by the machine learning model is below a threshold; the user does not have any or sufficient feedback data to generate a prediction, etc.). In the example shown, because too many users have been unplotted, representations are not shown for each user. However, the filters in frame 410 can be used to reduce the number of unplotted workers. In some embodiments, if a representation of a user is provided in frame 440, the system is configured to receive an input, such as a drag and drop input, to move an unplotted user to a particular placement location within evaluation matrix 420.

Figure 5A:
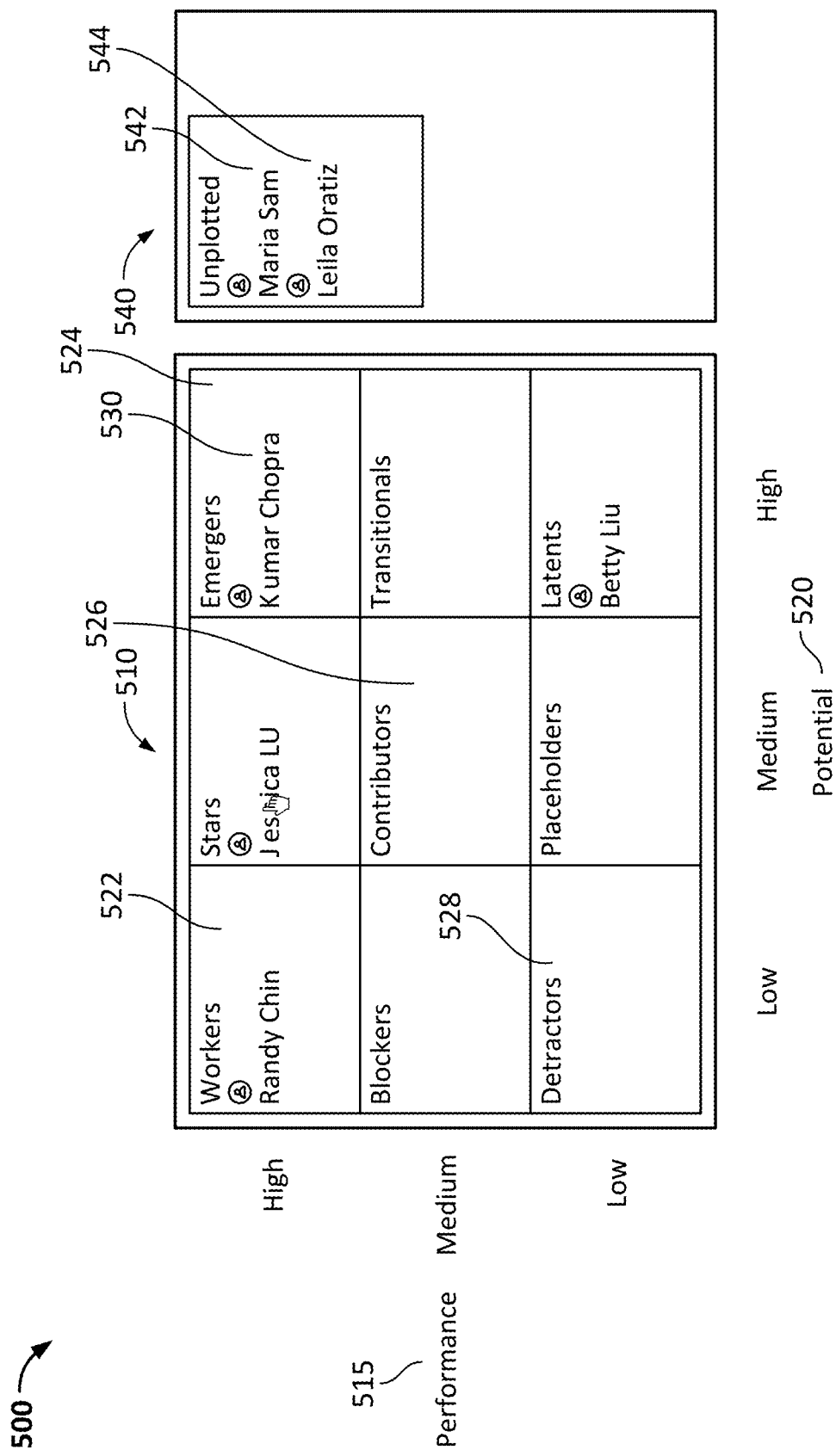
FIG. 5A illustrates an example of user interface to present a visualization based at least in part on a set of performance classifications for a set of users according to various embodiments of the present application.
Figure 5B:
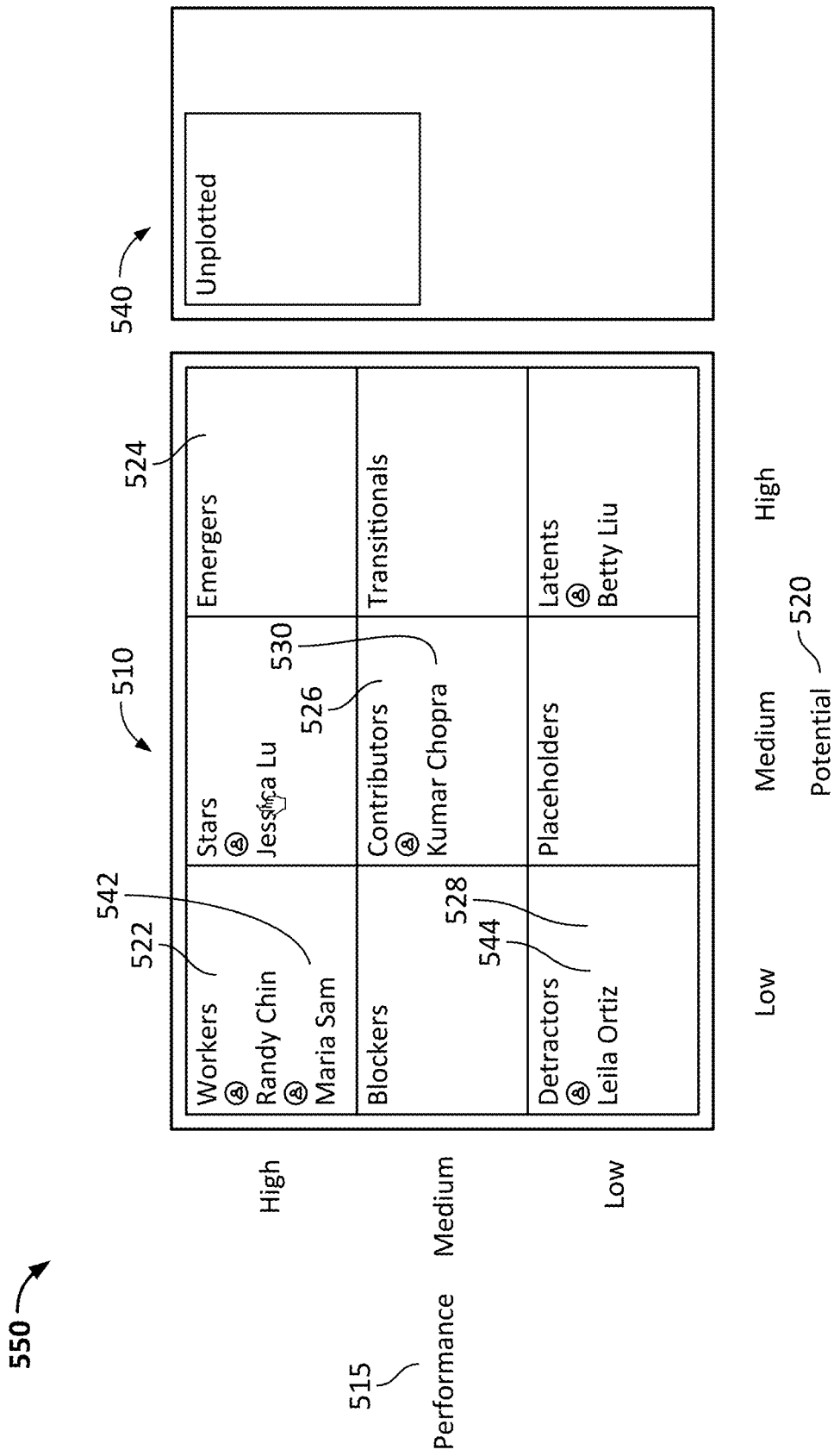
FIG. 5B illustrates an example of user interface to present a visualization based at least in part on a set of updated performance classifications for a set of users according to various embodiments of the present application.

FIG. 5A illustrates an example of a user interface to present a visualization based at least in part on a set of performance classifications for a set of users according to various embodiments of the present application. FIG. 5B illustrates an example of a visualization based at least in part on a set of updated performance classifications for a set of users according to various embodiments of the present application.

In the example shown, visualization 500 comprises evaluation matrix 510 within which a set of users are plotted according to their performance classifications. Evaluation matrix 510 comprises a plurality of cells (e.g., cells 522, 524, 526, and 528, etc.) corresponding to various intersection points between the dimensions being plotted. In this example, the dimensions plotted in evaluation matrix comprise a performance dimension 515 and a potential dimension 520.

In some embodiments, each cell in the evaluation matrix 510 is mapped to a particular performer type. The cells in evaluation matrix 510 can be configured according to a similar mapping as described above with respect to visualization 400 of FIGS. 4A-4C.

Users are plotted into a particular cell in evaluation matrix 510 according to each user's particular performance classification. In the example shown, user 530 is plotted into cell 524. The system may pre-populate user placements within evaluation matrix 510, such as based on a predicted performance classification (e.g., a prediction obtained by querying a machine learning model) or a performance classification during a previous evaluation period.

Visualization 500 may further comprise a frame 540 comprising an indication of one or more users that are unplotted. For example, frame 540 can comprise a representation for users that have not been plotted, such as in the case that the user does not have an associated predicted performance classification (e.g., if the confidence of a prediction generated by the machine learning model is below a threshold, the user does not have any or sufficient feedback data to generate a prediction, etc.). In the example shown, frame 540 comprises representations for users 542 and 544.

According to various embodiments, the system configures visualization 500 to receive input from another system or service to update the placements of users in evaluation matrix 510. For example, the system is configured to receive a user input from a client system, such as a client system operated by a manager. The user input may be a drag and drop input that drags a representation for a user from a first placement location to a second placement location within visualization 500.

In the examples shown in visualization 500 and visualization 550, the system has received an input to move the representation of user 530 from cell 524 to 526. For example, a manager performing the performance evaluation may have dragged the user icon for user 530 from cell 524 to cell 526. Similarly, the system has received inputs to move the representations of users 542 and 544 from frame 540 comprising unplotted users to cells 522 and 528, respectively.

Figure 6:
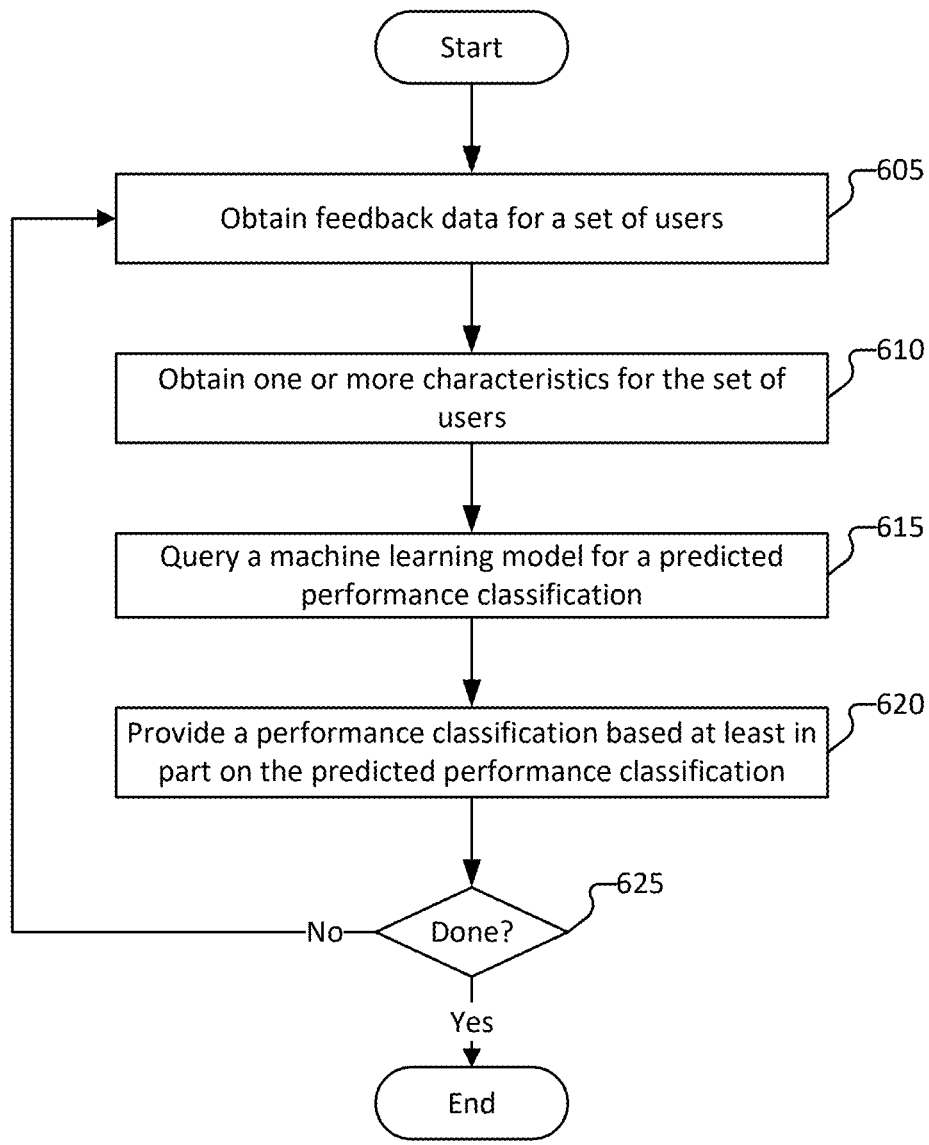
FIG. 6 is a flow diagram of a method for providing a performance classification according to various embodiments of the present application.

FIG. 6 is a flow diagram of a method for providing a performance classification according to various embodiments of the present application. In some embodiments, process 600 is implemented at least in part by system 100 of FIG. 1 and/or system 200 of FIG. 2.

In some embodiments, process 600 is implemented by a system or service that provides a performance evaluation, allows users within an organization to optimize the organization's talent, or otherwise performs succession planning. In some embodiments, the system implements process 600 in connection with generating a user interface to present performance evaluation information to a user. As an example, the performance classification can be provided by configuring a user interface to comprise a visualization that represents the performance classification for one or more users.

In some embodiments, the system generates one or more user interfaces to be presented to users via a client system. The user interfaces provide a service via which a user can manage, for example, talent or the generation of performance evaluations for a set of users (e.g., a set of reports or other employees). The system may generate a prepopulated performance classification, and the user can use selectable elements on the user interface, such as by dragging and dropping icons, to modify the performance classifications for one more users. The user interface can be provided to a client system for presentation to a user such as a manager that is performing the performance evaluation or a manager that is reviewing the organization's talent management. Generating the user interface may include generating a visualization to represent the performance classification (e.g., a heat map, an evaluation matrix, a report, etc.) and configuring the user interface to comprise the visualization.

At 605, the system obtains feedback data for a set of users. The feedback data is stored in one or more datasets in which the system stores feedback from one or more managers for the set of users. The feedback data can comprise feedback input by a set of managers for one or more users during a most recent evaluation period (e.g., current period). Additionally, the feedback data may comprise historical feedback, such as feedback input during previous evaluation periods.

The feedback data for a user can comprise feedback input by a manager, such as text-based feedback, that is feedback or performance ratings input by a manager(s). Additionally, the feedback data comprises comments on a user's goals (e.g., comments input by a manager).

In some embodiments, the feedback data comprises one or more performance characteristics, such as goals, earnings, skills, gigs, development tools, or managerial factors. The goals may be set by a manager or negotiated between a manager and a particular user (e.g., an employee). The gigs may be side projects (e.g., projects outside the user's current role) performed by the user, such as for other managers or departments. The development tools may be items that a manager believes the user needs to develop. The managerial factors can include an indication of whether the user is a worker or within a particular talent pool. In some embodiments, the managerial factor comprises a score to the participants of the Employee Review other than feedback or gig related scoring.

At 610, the system obtains one or more characteristics for the set of users. The one or more characteristics may comprise personal information for a user, such as employer identifier, employment history, educational history, role, past and/or present team members, past and/or present managers, age, race, gender, etc. Various other types of user characteristics may be implemented.

At 615, the system queries a machine learning model for a predicted performance classification. The system queries the machine learning model based at least in part on feedback data and one or more characteristics for a particular user.

At 620, the system provides a performance classification based at least in part on the predicted performance classification. In some embodiments, the system provides the performance classification to a service or other system that invoked process 600.

The system may provide the performance classification to a client system, such as via a user interface. For example, the system generates a visualization based at least in part on the performance classification. The system can further generate/configure a user interface to present (e.g., render) the visualization for presentation to a user via a client system. The visualization may include a representation of a set of performance classifications for a set of users, such as visualization 500 of FIG. 5A. In some embodiments, the visualization includes a matrix of cells along different dimensions, such as performance and potential.

At 625, a determination is made as to whether process 600 is complete. In some embodiments, process 600 is determined to be complete in response to a determination that no further performance classifications are to be determined (e.g., predicted), no further users (e.g., employees) are to be evaluated, an administrator indicates that process 600 is to be paused or stopped, etc. In response to a determination that process 600 is complete, process 600 ends. In response to a determination that process 600 is not complete, process 600 returns to 605.

Figure 7:
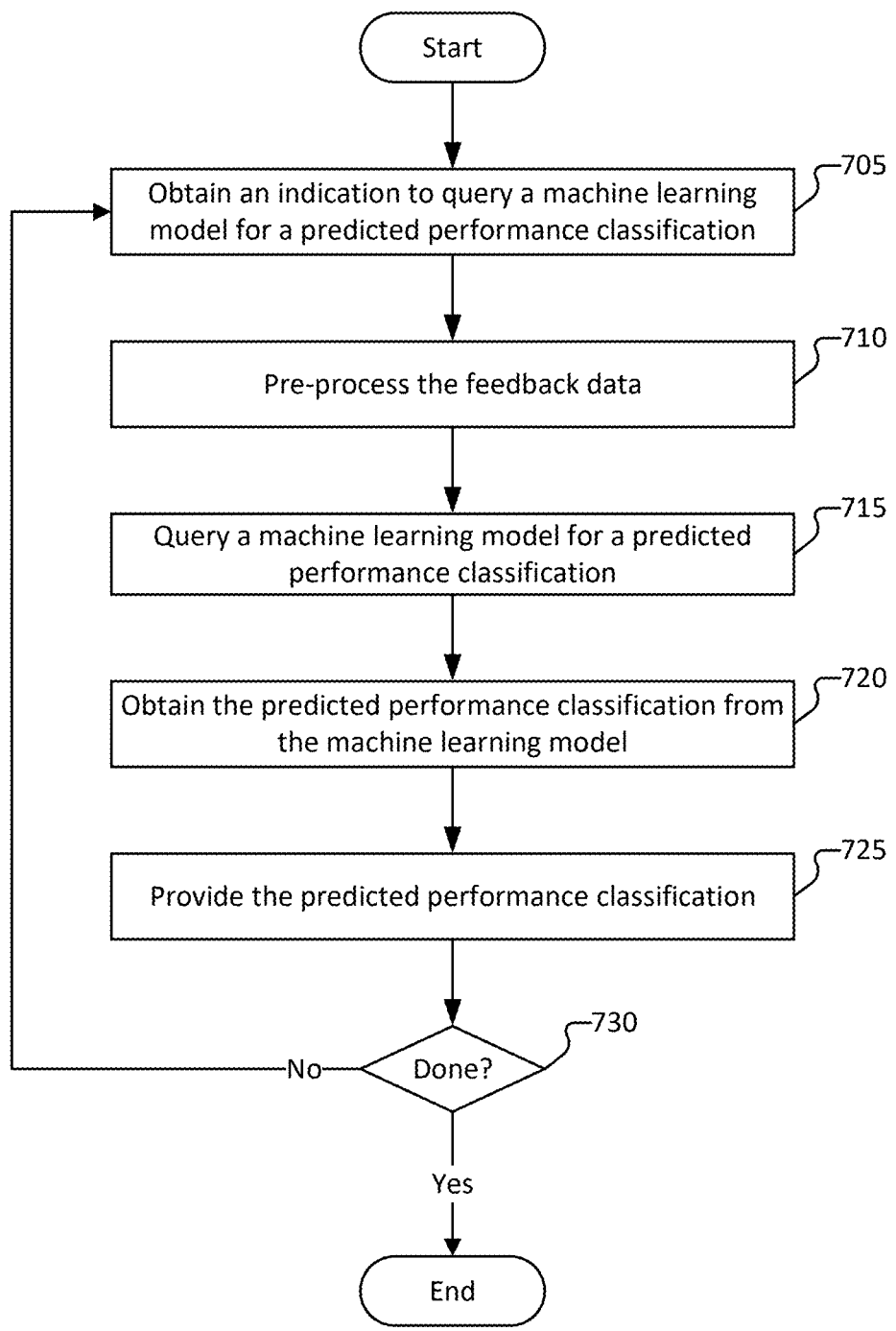
FIG. 7 is a flow diagram of a method for obtaining a predicted performance classification based on querying a performance prediction classifier according to various embodiments of the present application.

FIG. 7 is a flow diagram of a method for obtaining a predicted performance classification based on querying a performance prediction classifier according to various embodiments of the present application. In some embodiments, process 700 is implemented at least in part by system 100 of FIG. 1 and/or system 200 of FIG. 2.

In some embodiments, process 700 is implemented by a system or service that provides a performance evaluation, allows users within an organization to optimize the organization's talent, or otherwise performs succession planning. Process 700 may be invoked by process 600, such as at 615. In some embodiments, the system implements process 700 in connection with generating a user interface to present performance evaluation information to a user. As an example, the performance classification can be provided by configuring a user interface to comprise a visualization that represents the performance classification for one or more users.

In some embodiments, the system generates one or more user interfaces to be presented to users via a client system. The user interfaces provide a service via which a user can manage, for example, talent or the generation of performance evaluations for a set of users (e.g., a set of reports or other employees). The system may generate a prepopulated performance classification, and the user can use selectable elements on the user interface, such as by dragging and dropping icons, to modify the performance classifications for one more users. For example, the system configures the user interface to show a set of predicted performance classifications for a set of one or more users prepopulated and enable a user (e.g., the manager) to modify the performance classifications for the set of one or more users. The user interface can be provided to a client system for presentation to a user such as a manger that is performing the performance evaluation or a manager that is reviewing the organization's talent management. The generating the user interface may include generating a visualization to represent the performance classification (e.g., a heat map, an evaluation matrix, a report, etc.) and configuring the user interface to comprise the visualization.

At 705, the system obtains an indication to query a machine learning model for a predicted performance classification. At 710, the system pre-processes the feedback data. In some embodiments, the system pre-processes the feedback to remove outliers (e.g., statistically significant outliers). At 715, the system queries a machine learning model for a predicted performance classification. The machine learning model may be trained on prior performance classifications of the same user or other users with their particular feedback data (e.g., the user's reviews or ratings, etc.). At 720, the system obtains the predicted performance classification from the machine learning model. At 725, the system provides the predicted performance classification. The system can provide the predicted performance classification in connection with pre-populating a visualization to be provided to a user(s) (e.g., a manager). The user(s) can provide an input to update the performance classification, such as by dragging and dropping an indicator for a user to another space in the visualization (e.g., to move the indicator to another cell in the matrix of performance versus potential). At 730, a determination is made as to whether process 700 is complete. In some embodiments, process 700 is determined to be complete in response to a determination that no further performance classifications are to be determined (e.g., predicted), no further users (e.g., employees) are to be evaluated, an administrator indicates that process 700 is to be paused or stopped, etc. In response to a determination that process 700 is complete, process 700 ends. In response to a determination that process 700 is not complete, process 700 returns to 705.

Figure 8:
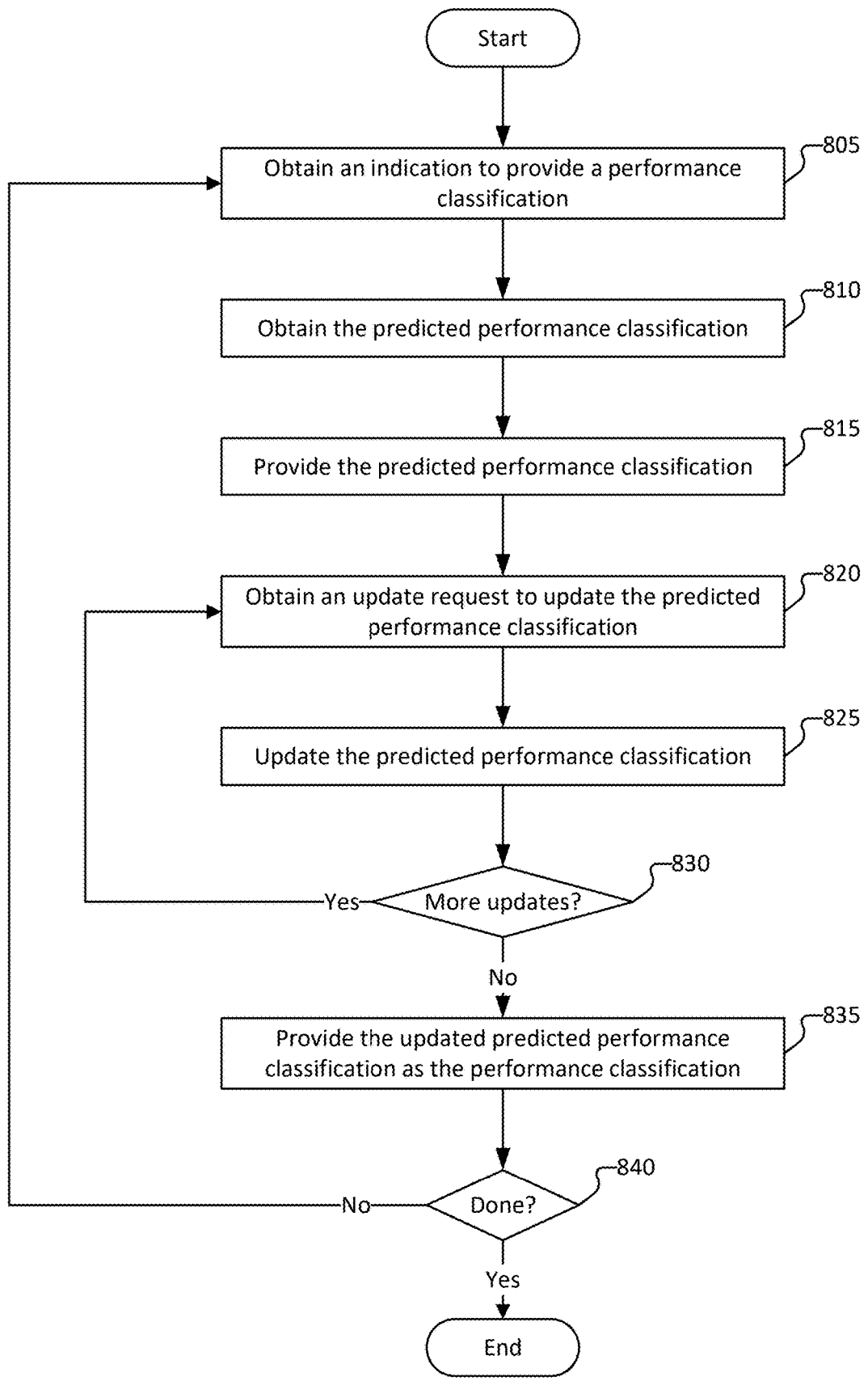
FIG. 8 is a flow diagram of a method for generating a user interface performance classification according to various embodiments of the present application.

FIG. 8 is a flow diagram of a method for providing performance classification according to various embodiments of the present application. In some embodiments, process 800 is implemented at least in part by system 100 of FIG. 1 and/or system 200 of FIG. 2. In some embodiments, the system implements process 800 in connection with generating a user interface to present performance evaluation information to a user. As an example, the performance classification can be provided by configuring a user interface to comprise a visualization that represents the performance classification for one or more users.

In some embodiments, the system generates one or more user interfaces to be presented to users via a client system. The user interfaces provide a service via which a user can manage, for example, talent or the generation of performance evaluations for a set of users (e.g., a set of reports or other employees). The system may generate a prepopulated performance classification, and the user can use selectable elements on the user interface, such as by dragging and dropping icons, to modify the performance classifications for one more users. For example, the system configures the user interface to show a set of predicted performance classifications for a set of one or more users prepopulated and enable a user (e.g., the manager) to modify the performance classifications for the set of one or more users. The user interface can be provided to a client system for presentation to a user such as a manager that is performing the performance evaluation or a manager that is reviewing the organization's talent management. Generating the user interface may include generating a visualization to represent the performance classification (e.g., a heat map, an evaluation matrix, a report, etc.) and configuring the user interface to comprise the visualization.

At 805, the system obtains an indication to provide a performance classification. At 810, the system obtains the predicted performance classification. The system can query a machine learning model for the predicted performance classification. For example, the system obtains the predicted performance classification from process 700, such as the predicted performance classification provided at 725. At 815, the system provides the predicted performance classification. The system can generate a visualization that represents the predicted performance classification and provide the visualization to another system or service, such as to a client system or via a web page. For example, the visualization may comprise an evaluation matrix or another representation of a spectrum along one or more performance dimensions, and the system generates a user representation (e.g., a user name or a user icon) for a particular user and configures the placement of the user representation along the one or more performance dimensions based at least in part on the predicted performance classification. At 820, the system obtains an update request to update the predicted performance classification. The system can receive a user input to the visualization, such as to change a placement of a user representation to a different location along the spectrum. At 825, the system updates the predicted performance classification. For example, the system updates the predicted performance classification (e.g., to obtain a performance classification, or a classification that is no longer the prediction generated by the ML model) based on the update request. In response to the user moving the placement of the user representation to another location along the spectrum, the system can update the values for the user performance along the applicable dimensions. At 830, the system determines whether any additional updates are to be performed. In response to determining that additional updates are to be performed, process 800 returns to 820 and process iterates over 820-830 until no further updates are to be performed. Conversely, in response to determining that no further updates are to be performed, process 800 proceeds to 835. At 835, the system provides the updated predicted performance classification as the performance classification. At 840, a determination is made as to whether process 800 is complete. In some embodiments, process 800 is determined to be complete in response to a determination that no further performance classifications are to be determined (e.g., predicted), no further performance classifications are to be provided or visualized, no further users are to be evaluated, an administrator indicates that process 800 is to be paused or stopped, etc. In response to a determination that process 800 is complete, process 800 ends. In response to a determination that process 800 is not complete, process 800 returns to 805.

Figure 9:
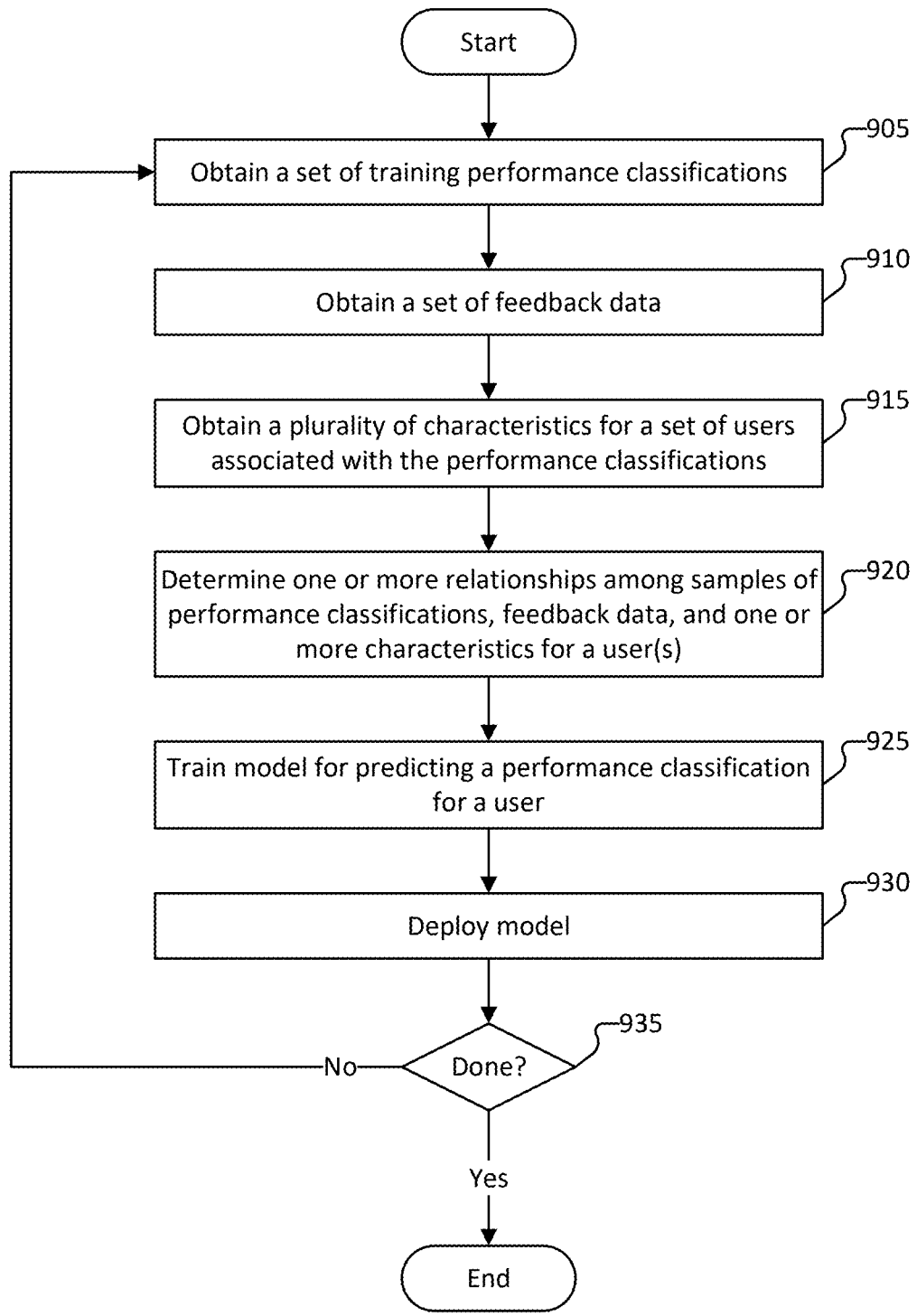
FIG. 9 is a flow diagram of a method for training a model according to various embodiments.

FIG. 9 is a flow diagram of a method for training a model according to various embodiments. In some embodiments, process 900 is implemented at least in part by system 100 of FIG. 1 and/or system 200 of FIG. 2.

At 905, the system obtains a set of training performance classifications. The set of training performance classifications can be a set of historical or previous performance classifications for a same set of users for which the model will predict performance classifications, or other users within the organization, etc. At 910, the system obtains a set of feedback data. The system obtains the feedback data for the users respectively associated with the performance classifications in the set of training performance classifications. At 915, the system obtains a plurality of characteristics for a set of users associated with the performance classifications. At 920, the system determines one or more relationships among samples of performance classifications, feedback data, and one or more characteristics for a user(s). At 925, the system trains a model for predicting a performance classification for a user. The model can be trained according to one or more machine learning techniques. Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. At 930, the system deploys the model. At 935, a determination is made as to whether process 900 is complete. In some embodiments, process 900 is determined to be complete in response to a determination that no further temporary data structures are to be updated to represent the data based on a manipulation of the data or a request to rearrange the data in the N-conjoined tree data structure, no further requests for manipulating or representing the data are received, the updated N-conjoined tree data structure(s) have been generated and provided, a user has exited the system, an administrator indicates that process 900 is to be paused or stopped, etc. In response to a determination that process 900 is complete, process 900 ends. In response to a determination that process 900 is not complete, process 900 returns to 905.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
   obtain feedback data for a set of users;
   pre-process the feedback data to remove statistically significant outliers and obtain pre-processed feedback data;
   obtain one or more characteristics for the set of users;
   train a machine learning model using the pre-processed feedback data;
   generate a predicted performance classification for the set of users using the machine learning model based at least in part on the pre-processed feedback data and the one or more characteristics;
   generate a user interface that comprises the predicted performance classification for at least a subset of the set of users; and
   update the predicted performance classification using the machine learning model based at least in part on an input to generate an updated performance classification; and
   a memory coupled to the one or more processors and configured to provide the one or more processors with instructions.

2. The system of claim 1, wherein the one or more characteristics comprise one or more of goals data, internal gigs data, skills data, development item data, and manager input data.

3. The system of claim 2, wherein the internal gigs data comprises information pertaining to user performance for projects outside a role definition for a corresponding user.

4. The system of claim 1, wherein:
   the one or more processors are further configured to obtain previous rating data for the set of users; and
   the machine learning model predicts the performance classification based at least in part on the previous rating data for the set of users.

5. The system of claim 1, wherein the machine learning model predicts the performance classification along one or more performance dimensions.

6. The system of claim 5, wherein the one or more performance dimensions comprise one or more of performance metrics and expected performance potential for the set of users.

7. The system of claim 1, wherein the one or more processors are further configured to identify talent gaps for an organization.

8. The system of claim 7, wherein the one or more processors are configured to:
   determine an active measure to perform based at least in part on the talent gaps; and
   cause the active measure to be implemented.

9. The system of claim 8, wherein the active measure comprises one or more of: (a) a talent growth action to upskill or develop a career for an existing user, (b) a reassignment of a particular user to another role associated with an identified talent gap, and (c) a talent acquisition action.

10. The system of claim 9, wherein the one or more processors are further configured to:
    recommend a leadership or succession plan with respect to at least one role based at least in part on the predicted performance classification.

11. The system of claim 1, wherein generating the user interface comprising the predicted performance classification for the at least subset of the set of users comprises:
    configuring a user interface to display a mapping of users to predicted performance classifications; and
    providing the user interface to a client system.

12. The system of claim 11, wherein:
    the mapping comprises a matrix comprising a plurality of cells respectively associated with a corresponding performance classification; and
    an indicator associated with a particular user in the at least subset of the set of users is displayed within one of the plurality of cells.

13. The system of claim 12, wherein the one or more processors are further configured to:
    receive a user input to modify a performance classification for the particular user; and
    update a placement of the indicator in the matrix based at least in part on the modified performance classification.

14. The system of claim 13, wherein the user input is a drag and drop command.

15. The system of claim 1, wherein generating a user interface comprising the predicted performance classification comprises:
    generating a heatmap that illustrates a distribution of performance classifications for the at least subset of the set of users; and
    configuring a user interface to be displayed at a client system, the user interface being configured to display the heatmap.

16. The system of claim 1, wherein generating the user interface comprising the predicted performance classification comprises:
    configuring a user interface to display an indication of a performance classification for a particular user juxtaposed with a previous performance classification for the particular user.

17. The system of claim 1, wherein the feedback data comprises an indication of a manager that submitted a particular feedback item, and a reputation of the manager is taken into account in connection with generating the predicted performance classification for the corresponding user.

18. The system of claim 17, wherein the reputation of the manager for the particular feedback item is stored as metadata for the feedback data.

19. The system of claim 1, wherein the one or more processors are further configured to:
    update the machine learning model after a predefined time period, wherein the machine learning model is updated based at least in part on the feedback data and the predicted performance classification generated by the machine learning model during a previous time interval.

20. The system of claim 1, wherein the feedback data and the one or more characteristics are stored in one or more databases.

21. A method, comprising:
- obtaining feedback data for a set of users;
- pre-processing the feedback data to remove statistically significant outliers and obtain pre-processed feedback data;
- obtaining one or more characteristics for the set of users;
- training a machine learning model using the pre-processed feedback data;
- generating a predicted performance classification for the set of users using the machine learning model based at least in part on the pre-processed feedback data and the one or more characteristics;
- generating a user interface comprising the predicted performance classification for at least a subset of the set of users; and
- updating the predicted performance classification using the machine learning model based at least in part on an input to generate an updated performance classification.

22. A computer program product embodied in a non-transitory computer readable medium and comprising computer instructions for:
- obtaining feedback data for a set of users;
- pre-processing the feedback data to remove statistically significant outliers and obtain pre-processed feedback data;
- obtaining one or more characteristics for the set of users;
- training a machine learning model using the pre-processed feedback data;
- generating a predicted performance classification for the set of users using the machine learning model based at least in part on the pre-processed feedback data and the one or more characteristics;
- generating a user interface comprising the predicted performance classification for at least a subset of the set of users; and
- updating the predicted performance classification using the machine learning model based at least in part on an input to generate an updated performance classification.

* * * * *